United States Patent
Enami

(10) Patent No.: US 10,671,871 B2
(45) Date of Patent: Jun. 2, 2020

(54) FABRIC TYPE IDENTIFYING APPARATUS

(71) Applicant: PUREX Co., Ltd., Kagawa (JP)

(72) Inventor: Yasuhiko Enami, Kagawa (JP)

(73) Assignee: PUREX CO., LTD., Kagawa (JP)

( * ) Notice: Subject to any disclaimer, the term of this patent is extended or adjusted under 35 U.S.C. 154(b) by 120 days.

(21) Appl. No.: 15/770,147

(22) PCT Filed: Oct. 21, 2016

(86) PCT No.: PCT/JP2016/081295
§ 371 (c)(1),
(2) Date: Apr. 20, 2018

(87) PCT Pub. No.: WO2017/069247
PCT Pub. Date: Apr. 27, 2017

(65) Prior Publication Data
US 2018/0314905 A1 Nov. 1, 2018

(30) Foreign Application Priority Data
Oct. 23, 2015 (JP) .................. 2015-209224

(51) Int. Cl.
G06K 9/32 (2006.01)
D06F 93/00 (2006.01)
D06H 3/08 (2006.01)

(52) U.S. Cl.
CPC .......... G06K 9/3216 (2013.01); D06F 93/00 (2013.01); D06H 3/08 (2013.01); G06K 2209/19 (2013.01)

(58) Field of Classification Search
None
See application file for complete search history.

(56) References Cited

U.S. PATENT DOCUMENTS 4,473,373 A    9/1984  Weiss
5,936,665 A    8/1999  Vachtsevanos
(Continued)

FOREIGN PATENT DOCUMENTS

DE    102008028120 A1    12/2009
EP         2623661 A1     8/2013
(Continued)

OTHER PUBLICATIONS

International Search Report for PCT/JP2016/081295, dated Dec. 20, 2016.
(Continued)

Primary Examiner — Fayyaz Alam

(57) ABSTRACT

To provide a fabric type identifying apparatus capable of photographing an identifier of fabric with high resolution to correctly recognize the identifier. A fabric type identifying apparatus A for identifying a type of a fabric F provided with an identifier I includes a camera 51 for photographing the fabric F, a traversing device 53 for moving the camera 51 crosswise in a direction orthogonal to a conveying direction of the fabric F, and an image processing apparatus 52 for receiving an image input and photographed by the camera 51. The image processing apparatus 52 identifies the type of the fabric F on a basis of the identifier I included in the input image of the fabric F. The position of the camera 51 is adjustable so that the identifier I passes through a photographing area, thereby enabling to bring the camera 51 closer to the fabric F to photograph the small identifier I with high resolution, resulting in recognizing the identifier I correctly.

6 Claims, 7 Drawing Sheets

(56) References Cited

U.S. PATENT DOCUMENTS

| | | | |
|---|---|---|---|
| 6,344,872 B1 | 2/2002 | Bresee | |
| 2009/0266749 A1 | 10/2009 | Heinz | |
| 2014/0326067 A1* | 11/2014 | Chanda | G01N 9/00 |
| | | | 73/32 R |
| 2015/0239195 A1* | 8/2015 | Wetsch | B31D 5/0073 |
| | | | 53/403 |
| 2015/0292142 A1* | 10/2015 | Tautz | B25J 11/00 |
| | | | 414/800 |
| 2016/0144407 A1 | 5/2016 | Sielemnann | |
| 2016/0145794 A1* | 5/2016 | Janakiraman | D06F 75/26 |
| | | | 219/250 |
| 2017/0004567 A1 | 1/2017 | Dutt | |
| 2017/0011452 A1* | 1/2017 | Beckham | G06Q 20/18 |
| 2018/0315178 A1 | 11/2018 | Enami | |

FOREIGN PATENT DOCUMENTS

| | | |
|---|---|---|
| GB | 1288289 A | 9/1972 |
| JP | H09-005258 A | 1/1997 |
| JP | 2001-113100 A | 4/2001 |
| JP | 2001-178604 A | 7/2001 |
| JP | 2014-202700 A | 10/2014 |

OTHER PUBLICATIONS

European Patent Office, European Search Opinion for European Patent Application No. 16857560.3, dated Jun. 6, 2019.
European Patent Office, Supplemental European Search Report for European Patent Application No. 16857560.3, dated Jun. 6, 2019.
USPTO, Non-Final Office Action for US Patent Application Publication No. 2018-0315178A1, dated Sep. 27, 2019.

* cited by examiner

F I G. 3 A
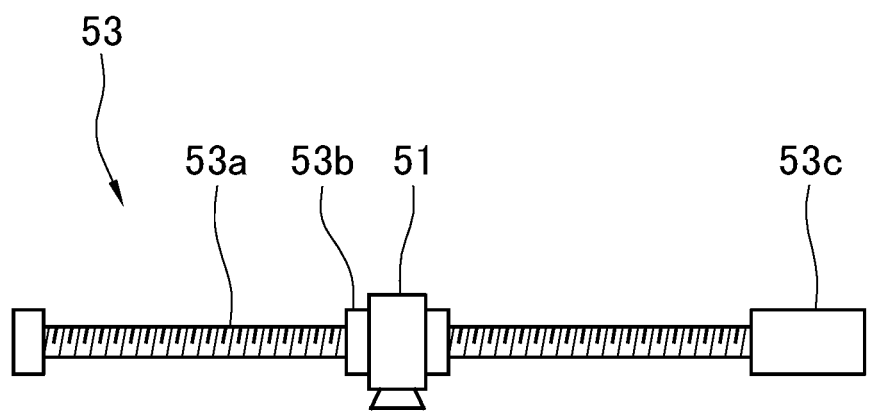
F I G. 3 B
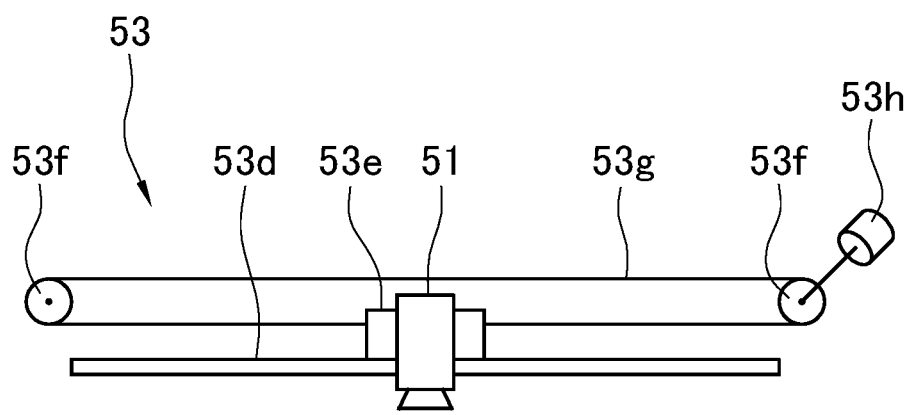

FABRIC TYPE IDENTIFYING APPARATUS

TECHNICAL FIELD

The present invention relates to a fabric type identifying apparatus. More specifically, the present invention relates to a fabric type identifying apparatus for identifying a type of fabric on a basis of an identifier attached to the fabric.

BACKGROUND ART

In general, a large amount of fabric such as sheets, cover fabrics, pillow cases, towels and the like are used in hotels, hospitals and the like, and the used fabric is collected and subjected to washing, ironing and folding at a laundry factory, and then carried back to hotels, hospitals and the like for use.

One type of linen equipment installed in a laundry factory is configured with a set including a charging machine, a roll ironer and a folding machine. In such linen equipment, a processing line is formed with these machines such that the charging side of the roll ironer is connected to the exit side of the charging machine, and the charging side of the folding machine is connected to the exit side of the roll ironer. When put in the charging machine, a fabric after washing is spread out into a slack-free and neatly-shaped state, ironed by the roll ironer, and folded by the folding machine.

Patent Document 1 discloses that types of fabric are identified on the basis of length information and thickness information on fabric and a folding machine classifies fabric by type. However, there is a problem that, since fabric is easy to stretch and shrink, when there are no larger dimensional differences among the types than the dimensional change caused due to the stretching and shrinking thereof, stable identification with high accuracy is not made.

CITATION LIST

Patent Literature

[Patent Document 1] Japanese Patent Laid-Open Publication No. 2001-113100

SUMMARY OF INVENTION

Technical Problem

In some cases, a color thread, a tag or the like is attached to fabric. Utilizing of the color thread or the tag as an identifier enables to stably identify a type of fabric with high accuracy regardless of the stretching and shrinking of the fabric. In order that an apparatus automatically identifies a type of fabric on the basis of an identifier, a camera may photograph the fabric and may analyze the photographed image to recognize the identifier. However, the color thread or the tag is smaller than the fabric. Therefore, if the whole fabric is photographed by a camera having a general number of pixels, the resolution of the portion of the color thread or the tag is insufficient, and thus they may be identified incorrectly.

In view of the above-described problem, the object of the present invention is to provide a fabric type identifying apparatus capable of photographing an identifier of fabric with high resolution to correctly recognize the identifier.

Solution to Problem

The fabric type identifying apparatus of the first invention is a fabric type identifying apparatus for identifying a type of a fabric provided with an identifier, including a camera for photographing the fabric, a traversing device for moving the camera crosswise in a direction orthogonal to a conveying direction of the fabric, and an image processing apparatus for receiving an image input and photographed by the camera. The image processing apparatus identifies the type of the fabric on a basis of the identifier included in the input image of the fabric.

The fabric type identifying apparatus of the second invention includes a traverse controller for controlling the traversing device, in the first invention. The traverse controller operates the traversing device to dispose the camera at a position so that the identifier passes through a photographing area of the camera, when position information of the identifier is input.

In the fabric type identifying apparatus of the third invention, in the second invention, the traverse controller receives the position information of the identifier from a charging machine in which the fabric is put.

The fabric type identifying apparatus of the fourth invention includes a position detector for detecting a position of the identifier, in the second invention. The traverse controller receives the position information of the identifier from the position detector.

Advantageous Effects of Invention

According to the first invention, the camera is allowed to be moved crosswise in the direction orthogonal to the conveying direction of the fabric, thereby enabling to adjust the position of the camera so that the identifier of the fabric passes through the photographing area. Therefore, the camera is allowed to be brought closer to the fabric, thereby enabling to photograph the small identifier with high resolution, resulting in correctly recognizing the identifier.

According to the second invention, the traverse controller automatically adjusts the position of the camera, thereby reducing labor of a worker.

According to the third invention, the position information of the identifier is input by the charging machine, thereby requiring no detector for detecting the position of the identifier, resulting in reducing a cost for equipment.

According to the fourth invention, the position detector for detecting the position of the identifier is included, thereby allowing the fabric type identifying apparatus to independently adjust the position of the camera.

BRIEF DESCRIPTION OF DRAWINGS

FIG. 3A is a diagram illustrating one example of a traversing device 53.

FIG. 3B is a diagram illustrating another example of the traversing device 53.

DESCRIPTION OF EMBODIMENTS

Embodiments according to the present invention are described below with reference to the drawings.

First Embodiment

A fabric type identifying apparatus A according to a first embodiment of the present invention is an apparatus for identifying a type of a fabric F.

(Fabric F)

Examples of the fabric F include a sheet, a cover fabric, a pillow case, a towel and the like. The fabric type identifying apparatus A deals with, among these fabrics F, especially the fabrics F each provided with a member available as an identifier I at a specific portion, such as a color thread Ia or a tag Ib. A representative example of the fabric F is a sheet.

Figure 7:
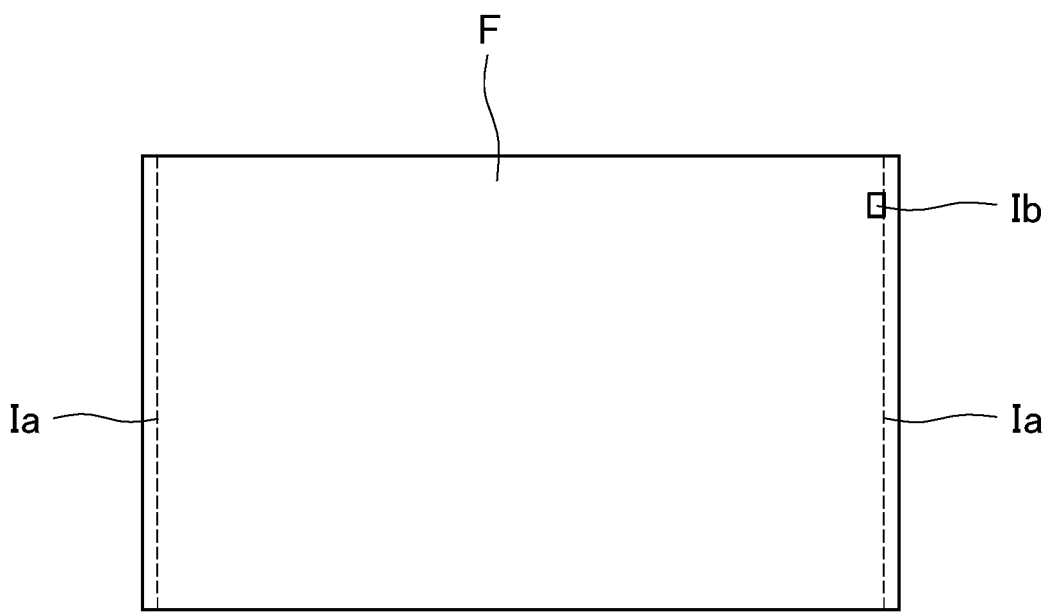
FIG. 7 is an explanatory diagram of the fabric F.
Figure 7:
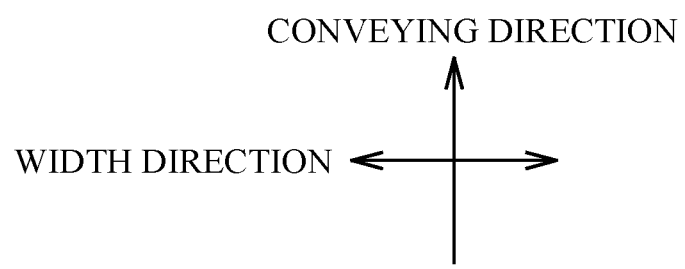

As shown in FIG. 7, a sheet F has a rectangular shape, and the color thread Ia is sewn on each edge portion of the sheet F. The color thread Ia is a colored thread. The sheet F is formed by cutting a long fabric into a predetermined dimension and performing edge processing to the cut portions. The color thread Ia is used for the edge processing. The color thread Ia is sewn along the entire edge portions of the sheet F. It is noted that the edge portion to which the color thread Ia is attached may be of a short side or long side of the sheet F.

The color threads Ia in different colors are used depending on a size of the sheet F. The color threads Ia in different colors are also used depending on a delivery destination of the sheet F (a user of the sheet F such as a hotel or a hospital). Thus, according to the color of the color thread Ia, the size of the sheet F is identified, and the delivery destination of the sheet F is also identified.

The tag Ib is also sewn on one edge portion of the sheet F. The tag Ib, on which a character, a mark or the like is put, includes various types of information such as a size of the sheet F. Thus, according to the character or the mark put on the tag Ib, the type of the sheet F is identified.

Examples of the identifier I include various types of members each for allowing a type of the fabric F to be identified, in addition to the color thread Ia and the tag Ib. Examples of the types of the fabric F to be identified on the basis of the identifier I include various attributes, in addition to the size and the delivery destination.

As described below, the fabric F is conveyed by linen equipment X. In the present specification, the direction orthogonal to the conveying direction of the fabric F is referred to as "width direction," while the dimension in the width direction of the fabric F is referred to as "width dimension."

(Linen equipment X)

Figure 1:
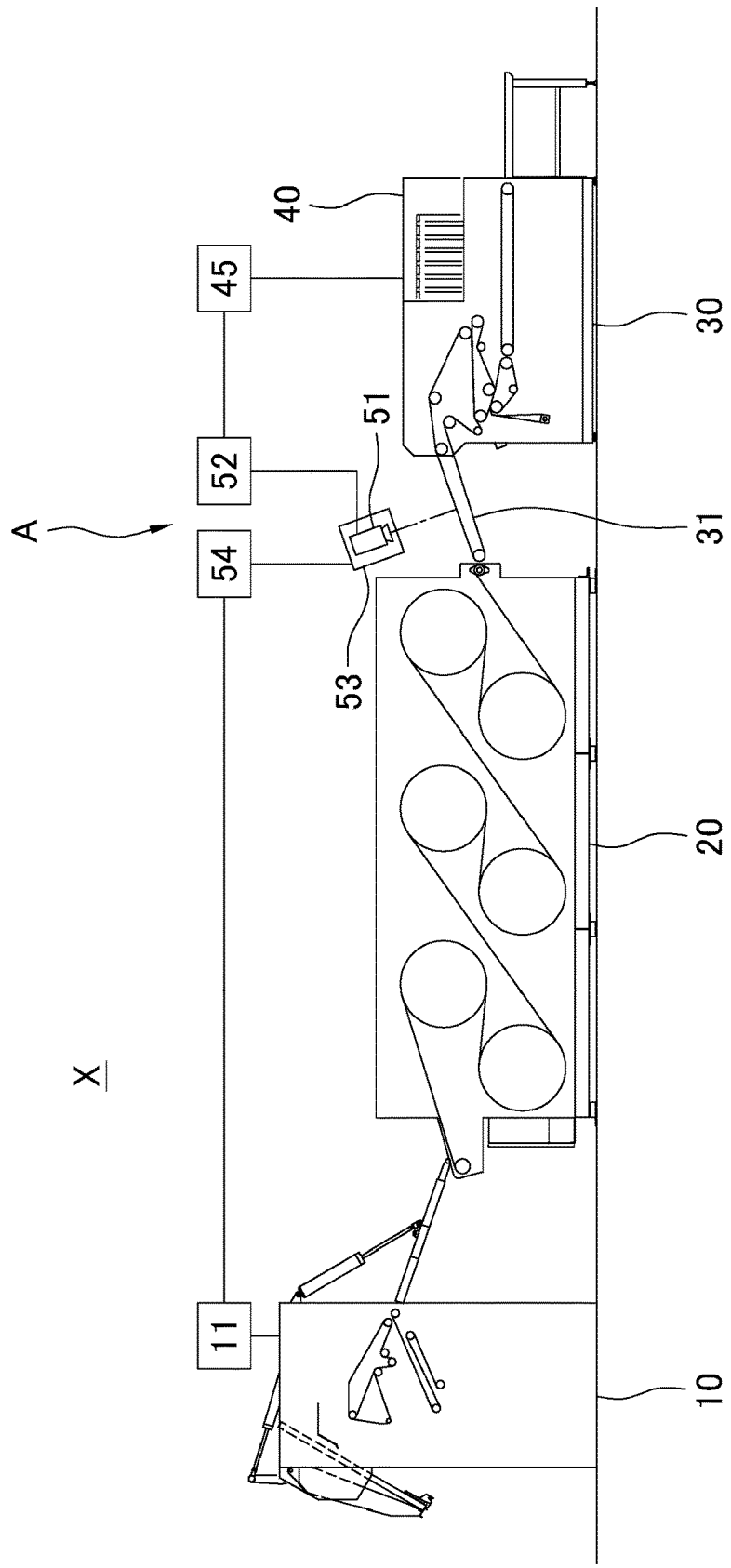
FIG. 1 is a side view of linen equipment X including a fabric type identifying apparatus A according to a first embodiment of the present invention.
Figure 2:
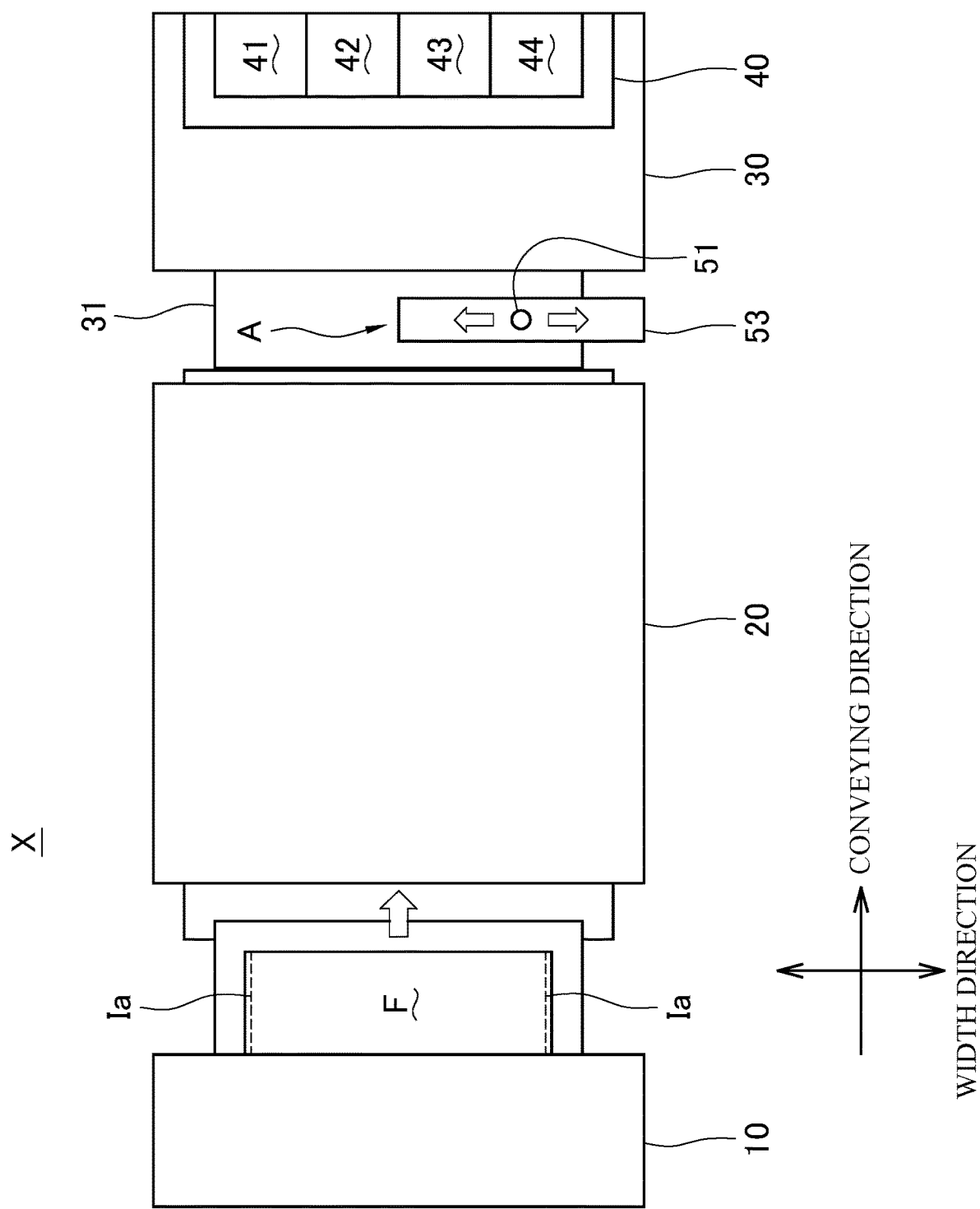
FIG. 2 is a plan view of the linen equipment X.

As shown in FIG. 1 and FIG. 2, the fabric type identifying apparatus A is provided in the linen equipment X for processing the fabric F. The linen equipment X is configured with a charging machine 10, a roll ironer 20 and a folding machine 30.

A processing line is formed with these machines such that the charging side of the roll ironer 20 is connected to the exit side of the charging machine 10, and the charging side of the folding machine 30 is connected to the exit side of the roll ironer 20. When put into the charging machine 10, the fabric F after washing is spread out into a slack-free and neatly-shaped state, ironed by the roll ironer 20, and folded by the folding machine 30.

The charging machine 10 is an apparatus in which the fabric F is put. When a worker puts the fabric F in the charging machine 10, the charging machine 10 hangs and spreads out the fabric F into a slack-free and neatly-shaped state, and then feeds it to the roll ironer 20.

The charging machine 10 includes a charging-machine controller 11. The charging-machine controller 11, which is a computer configured with a CPU, a memory and the like, controls the operation of the charging machine 10. The charging-machine controller 11 controls the operation of various operating parts of the charging machine 10, and also collects detection results from various sensors disposed in the charging machine 10.

The roll ironer 20 is an apparatus for ironing the fabric F received from the charging machine 10. The roll ironer 20 is equipped with one heating roller or a plurality of heating rollers. The roll ironer 20 conveys the fabric F while bringing it into contact with the heating roller(s), thereby enabling to dry the fabric F continuously. An introduction conveyor 31 of the folding machine 30 is connected to the last stage of the roll ironer 20, thereby enabling to feed the fabric F after ironing into the folding machine 30.

The folding machine 30 is a machine for folding the fabric F received from the roll ironer 20. The folding machine 30 includes a plurality of conveyors for conveying the fabric F and a plurality of folding devices each for folding the fabric F conveyed by the conveyor at a predetermined folding position. Each of the plurality of folding devices is configured with a folding plate and an actuator for driving the folding plate so as to move the folding plate forward and backward to a connecting portion of two of the conveyors. The fabric F is folded in such a manner that, the folding plate is driven at the timing when the folding position of the fabric F reaches the connecting portion of the conveyors, so as to tuck the folding position of the fabric F toward the connecting portion of the conveyors, and so that the fabric F in a folded state is pushed into the connecting portion of the conveyors. Repeating such folding operation a plurality of times enables to fold the fabric F into a predetermined shape.

In the final processing stage of the folding machine 30, a stacking part 40 for stacking the folded fabrics F is provided. The stacking part 40 has a plurality of discharge parts 41 to 44 for temporarily storing the folded fabrics F in a stacked state. Accordingly, the fabrics F classified and stacked by type are enabled to be discharged.

The stacking part 40 includes a stacking-part controller 45. The stacking-part controller 45, which is a computer configured with a CPU, a memory and the like, controls the operation of the stacking part 40. When the type of the fabric F is input by an external device, the stacking-part controller 45 controls the operation of the stacking part 40 so as to convey the targeted fabric F to one of the discharge parts 41 to 44 corresponding to the type. The correspondence relations between the types of the fabrics F and the discharge parts 41 to 44 herein may be stored in a storage of the stacking-part controller 45 in advance.

The stacking part 40 may be integrated with the folding machine 30 as in the present embodiment, or may be a stacking apparatus independent of the folding machine 30.

The fabric F put in the charging machine 10 is taken inside the charging machine 10 and spread out into a slack-free and neatly-shaped state, and then conveyed inside the roll ironer 20 and the folding machine 30. The fabric F is conveyed as described above, along the processing line of the linen equipment X. As shown in FIG. 2, the direction in which the fabric F is conveyed is referred to as a "conveying direction." The direction orthogonal to the conveying direction is referred to as a "width direction."

The fabric F after being spread out in the charging machine 10 is conveyed in the state where the edge portions to which the color threads Ia are attached respectively face the sides of the linen equipment X. That is, the fabric F is conveyed as is in the state where the width direction of the fabric F is set along the width direction of the linen equipment X, in the direction along the edge portions to which the color threads Ia are attached.

The fabric F is simply conveyed inside the roll ironer 20 in the conveying direction along the heating roller(s), without moving in the width direction. Accordingly, the position of the fabric F in the width direction just after discharging from the charging machine 10 is not different from the position at the time of conveying on the introduction conveyor 31 of the folding machine 30.

(Fabric type identifying apparatus A)

The fabric type identifying apparatus A is described below.

As shown in FIG. 1, the fabric type identifying apparatus A includes a camera 51 for photographing the fabric F and an image processing device 52 for receiving an image input and photographed by the camera 51. The camera 51 is disposed in the vicinity of the introduction conveyor 31 for connecting the roll ironer 20 and the folding machine 30, so as to photograph the fabric F conveyed on the introduction conveyor 31. A line sensor camera or an area sensor camera, without being particularly limited to one of these, serves as the camera 51.

The image processing device 52, which is a computer configured with a CPU, a memory and the like, has a function of performing image processing on the image of the fabric F input by the camera 51 to identify the type of the fabric F on the basis of the identifier I included in the image.

In the case of identifying the type of the fabric F on the basis of the color thread Ia, the image processing device 52 extracts the portion of the color thread Ia from the image of the fabric F input by the camera 51 to acquire the color value of the portion. Then, the image processing device 52 identifies the type of the fabric F on the basis of the acquired color value.

In general, an image photographed by a camera is of data expressed in the RGB color system. In the RGB color system, a color is expressed by a combination of R value expressing a red element, G value expressing a green element, and B value expressing a blue element. In the case where each element is expressed by 8 bits, each of R value, G value, and B value has a value in the range of 0 to 255. For example, a black color, where each element has a minimum value, is expressed as (R, G, B)=(0, 0, 0). A white color, where each element has a maximum value, is expressed as (R, G, B)=(255, 255, 255).

A variety of color systems other than the RGB color system are used as a color system, such as the XYZ color system and the Yxy color system. In the present specification, "color value" means a value expressing a color in an arbitrary color system, corresponding to R value, G value, and B value in the RGB color system.

Type identification of the fabric F based on the color value of the color thread Ia is performed as follows.

The storage of the image processing device 52 stores a color value for reference (hereinafter referred to as "reference color value") for each type of the fabric F in advance.

The image processing device 52 searches the reference color values stored in the storage for the color value of the color thread Ia acquired from the image of the fabric F. Then, the image processing device 52 determines the type of the targeted fabric F as the type corresponding to the found reference color value.

In the case of identifying the type of the fabric F on the basis of the tag Ib, the image processing device 52 extracts the portion of the tag Ib from the image of the fabric F input by the camera 51 and analyzes the portion of the image to recognize the character or the mark put to the tag Ib. Then, the image processing device 52 identifies the type of the fabric F on the basis of the recognized character or mark.

The image processing device 52 is connected to the stacking-part controller 45. The type of the fabric F identified by the image processing device 52 is input into the stacking-part controller 45. The stacking-part controller 45 controls the operation of the stacking part 40 on the basis of the input type of the fabric F, so as to convey the targeted fabric F to one of the discharge parts 41 to 44 corresponding to the type.

As described above, since the type of the fabric F is identified on the basis of the identifier I, the type of the fabric F is enabled to be stably identified with high accuracy regardless of stretching and shrinking of the fabric F. Moreover, the type of the fabric F is identified according to not only the size of the fabric F but also the delivery destination thereof. The discharge parts 41 to 44 of the stacking part 40 are switched according to the identification result by the fabric type identifying apparatus A, thereby enabling to automatically classify the fabrics F by type.

The general color thread Ia has a thickness of approx. 0.3 mm, which is extremely thin. The tag Ib has a size of several centimeter square, which is extremely small. If the whole fabric F to which such a small identifier I is attached is photographed by the camera 51 having a general number of pixels, the resolution of the portion of the identifier I is insufficient, and thus the image processing device 52 may fail to correctly recognize the identifier I.

On the other hand, when the camera 51 is brought closer to the fabric F, that is, when the camera 51 is brought closer to the conveying surface of the introduction conveyor 31, the resolution of the portion of the identifier I improves, and thus the image processing device 52 can correctly recognize the identifier I. However, when the camera 51 is brought closer to the fabric F, the photographing area of the camera 51 becomes narrower, and thus the portion of the identifier I may deviate from the photographing area of the camera 51 in some cases.

Figure 4:
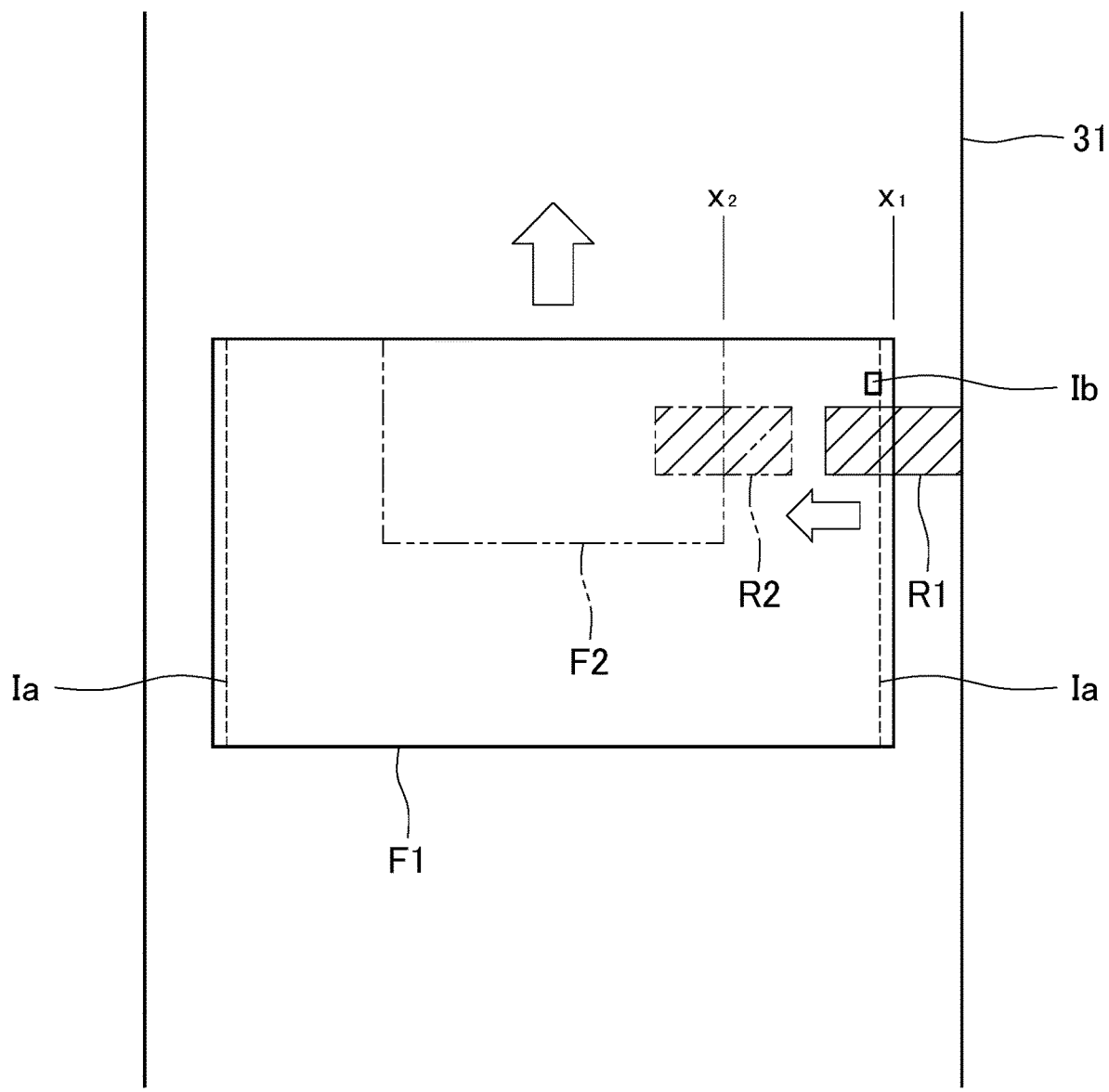
FIG. 4 is an explanatory diagram illustrating a relation between a photographing area of a camera 51 and a position of an edge portion of a fabric F.

Some types of the charging machines 10 discharge the fabric F such that the center in the width direction of the fabric F is set along the center in the width direction of the charging machine 10. As shown in FIG. 4, in the case of using such a type of the charging machine 10, a position $x_1$ in the width direction of one edge portion of a wide fabric F1 differs from a position $x_2$ in the width direction of one edge portion of a narrow fabric F2. That is, the position in the width direction of the color thread Ia or the tag Ib varies depending on the width dimension of the fabric F.

The position in the width direction of the camera 51 needs to be adjusted in order to bring the camera 51 closer to the fabric F and further to position the identifier I in the photographing area of the camera 51.

As shown in FIG. 2, the fabric type identifying apparatus A includes a traversing device 53 for moving the camera 51 crosswise in the width direction. Any configuration of the traversing device 53 is available without being limited particularly, as long as the configuration allows the camera 51 to move linearly. For example, the configuration shown in FIG. 3A or FIG. 3B is used.

The traversing device 53 shown in FIG. 3A includes a ball screw mechanism configured with a screw shaft 53a and a nut part 53b. The camera 51 is fixed to the nut part 53b of the ball screw mechanism. The screw shaft 53a is connected to a motor 53c. The screw shaft 53a is rotated by driving of the motor 53c, thereby enabling to move the camera 51 crosswise.

The traversing device 53 shown in FIG. 3B includes a slider 53e for sliding on a rail 53d and an endless chain 53g wound around a pair of sprockets 53f. The slider 53e is fixed to the endless chain 53g. A motor 53h is connected to one of the sprockets 53f. The sprockets 53f are rotated by driving of the motor 53h, thereby enabling to move the camera 51 crosswise.

The moving range of the camera 51 by the traversing device 53 may be the whole width through which the fabric F may pass, that is, the whole width of the introduction conveyor 31, or may be a narrower range. In an example, as shown in FIG. 2, the moving range of the camera 51 may be the range from the center in the width direction of the introduction conveyor 31 to one side part thereof. Even the range in this case is sufficient as the moving range of the camera 51 because the edge portion to which the color thread Ia or the tag Ib is attached passes through the range. In the case where variation of the position of the identifier I is small, the moving range of the camera 51 may be set smaller as long as the moving range of the camera 51 includes the range within which the position of the identifier I is changed. In short, the moving range of the camera 51 may be determined so that the identifier I of even any type of the fabric F can pass through the photographing area of the camera 51.

As shown in FIG. 1, the fabric type identifying apparatus A includes a traverse controller 54 for controlling the traversing device 53. The traverse controller 54 is a computer configured with a CPU, a memory and the like. The position information of the identifier I is input by an external device into the traverse controller 54. The position information of the identifier I includes the position in the width direction of the identifier I.

In the present embodiment, the position information of the edge portion of the fabric F, that is, the position information of the identifier I, is input by the charging-machine controller 11 into the traverse controller 54. The charging-machine controller 11 acquires the position information of the edge portion of the fabric F at the time of being discharged from the charging machine 10, on the basis of the detection results by various sensors disposed in the charging machine 10 and the operation results at various operation parts. The charging-machine controller 11 inputs the position information into the traverse controller 54.

In the case where the position information of the identifier I is input, the traverse controller 54 operates the traversing device 53 to position the camera 51 so that the identifier I passes through the photographing area of the camera 51.

In an example, as shown in FIG. 4, in the case where the wide fabric F1 is put in, the charging-machine controller 11 inputs the position $x_1$ in the width direction of one edge portion of the fabric F1 into the traverse controller 54. The traverse controller 54 moves the camera 51 crosswise so that the position $x_1$ is included in a photographing area R1 of the camera 51. Accordingly, the color thread Ia or the tag Ib of the fabric F1 passes through the photographing area R1, and thus the color thread Ia or the tag Ib attached to the edge portion of the fabric F1 is photographed with high resolution.

Next, suppose that the narrower fabric F2 is put in. If the camera 51 is left as is without being moved crosswise, the color thread Ia or the tag Ib of the fabric F2 does not pass through the photographing area R1, and thus the image processing device 52 cannot recognize the color thread Ia or the tag Ib. Therefore, the charging-machine controller 11 inputs the position $x_2$ in the width direction of one edge portion of the fabric F2 into the traverse controller 54. The traverse controller 54 moves the camera 51 crosswise so that the position $x_2$ is included in a photographing area R2. Accordingly, the color thread Ia or the tag Ib of the fabric F2 passes through the photographing area R2, and thus the color thread Ia or the tag Ib attached to the edge portion of the fabric F2 is photographed with high resolution.

Any position of the identifier I is available without being limited particularly, as long as the identifier I passes through the photographing area R. That is, the identifier I may pass through the center of the photographing area R, or may pass through the edge part of the photographing area R.

As described above, the camera 51 is movable crosswise in the width direction, thereby enabling to adjust the position of the camera 51 so that the identifier I of the fabric F passes through the photographing area. Therefore, the camera 51 is allowed to be brought closer to the fabric F, thereby enabling to photograph the small identifier I with high resolution. As a result, the identifier I is recognized correctly.

Moreover, the traverse controller 54 automatically adjusts the position of the camera 51 without requiring labor of a worker.

The position information of the identifier I is input by the charging machine 10 into the traverse controller 54, thereby requiring no detector for detecting the position of the identifier I, resulting in reducing a cost for equipment.

Any position of the camera 51 is available without being limited particularly, as long as the camera 51 is positioned in the downstream side of the discharge part of the charging machine 10. However, in some cases, the color density of the color thread Ia may change before and after ironing. Therefore, the camera 51 is preferably disposed in the downstream side of the roll ironer 20 as in the present embodiment because the color of the color thread Ia is identified accurately.

(Operation)

The operation of the linen equipment X and the fabric type identifying apparatus A is described below.

First, a worker puts the fabric F after washing in the charging machine 10. The fabric F put in the charging machine 10 is taken inside the charging machine 10 and spread out, and then conveyed to the roll ironer 20.

The charging-machine controller 11 inputs the position information of the edge portion of the fabric F into the traverse controller 54. The traverse controller 54 operates the traversing device 53 to move the camera 51 crosswise so that the edge portion of the fabric F, that is, the identifier I, passes through the photographing area.

The fabric F passed through the roll ironer 20 is photographed by the camera 51 while being conveyed on the introduction conveyor 31. Since the position in the width direction of the camera 51 has been adjusted in advance, the edge portion of the fabric F passes through the photographing area.

A conveying distance exists between the discharging position of the charging machine 10 and the photographing position of the camera 51, thereby generating a time lag between the time when the fabric F is discharged by the charging machine 10 and the time when the fabric F is photographed. The traverse controller 54 operates the traversing device 53, taking the time lag into consideration. In an example, the traverse controller 54 tracks the fabric F on the basis of the conveying speed of the roll ironer 20, and completes the position adjustment of the camera 51 prior to photographing the targeted fabric F.

The image photographed by the camera 51 is input into the image processing device 52. The image processing device 52 performs image processing on the photographed image to identify the type of the targeted fabric F on the basis of the identifier I.

The identification result by the image processing device 52 is input into the stacking-part controller 45. The stacking-part controller 45 controls the operation of the stacking part 40 so as to convey the targeted fabric F to one of the discharge parts 41 to 44 corresponding to the input type.

Due to the conveying distance existing between the photographing position of the camera 51 and the stacking part 40, a time lag is required between the time when the image processing part 52 identifies the type and the time when the stacking part 40 is operated. The stacking-part controller 45 operates the stacking part 40, taking the time lag into consideration. In an example, in the configuration where a rotary encoder is disposed on a conveyor included in the folding machine 30 so as to recognize the conveying distance for the fabric F, the fabric F having reached the corresponding one of the discharge parts 41 to 44 is detected. The stacking part 40 may be operated at the detected timing.

As described above, after the type of the fabric F is identified, the fabric F is conveyed to one of the discharge parts 41 to 44 corresponding to the identified type, thereby enabling to classify and stack the fabrics F by type. Accordingly, a worker does not have to classify the fabrics F by type, resulting in reducing labor of a worker.

Second Embodiment

A fabric type identifying apparatus B according to a second embodiment of the present invention is described below.

Figure 5:
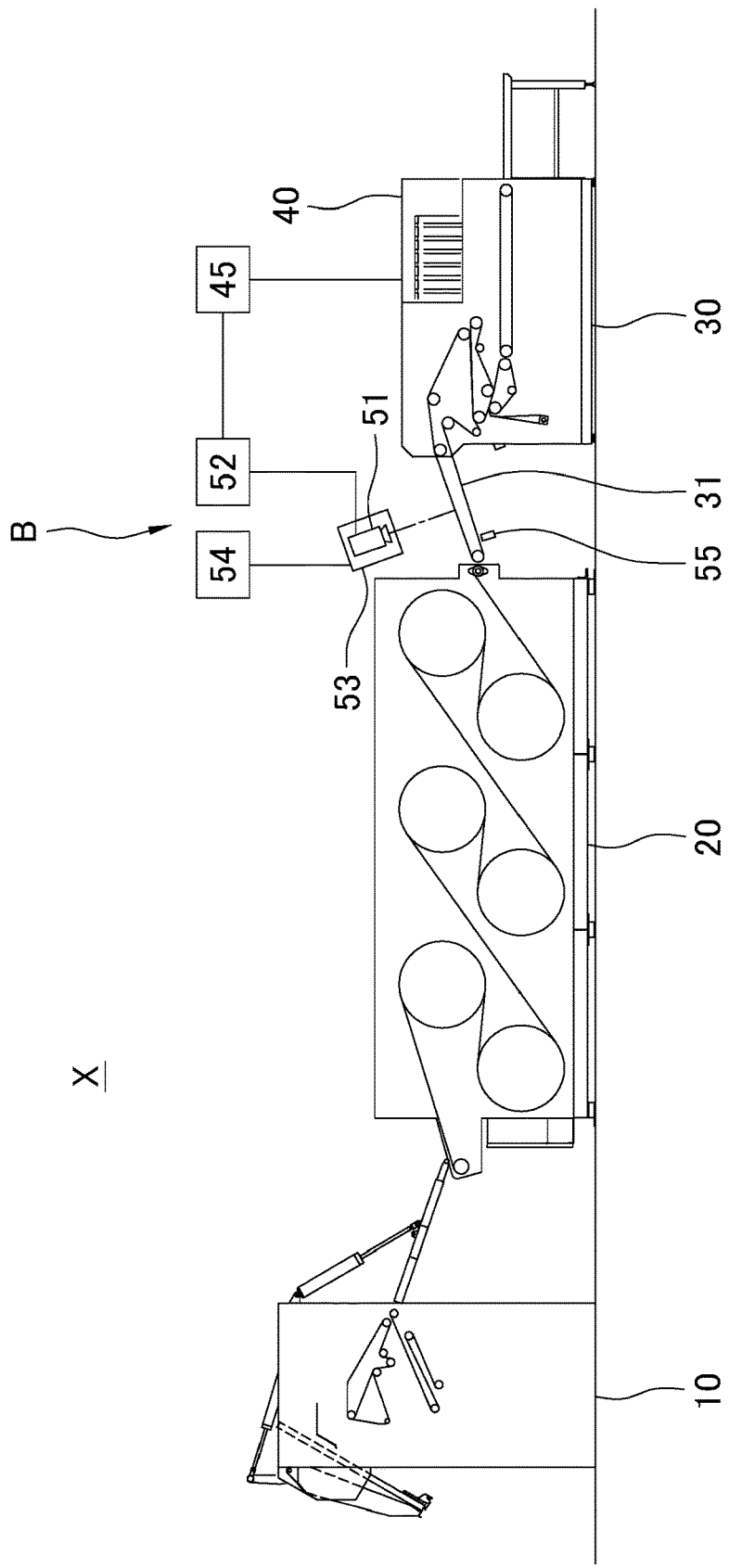
FIG. 5 is a side view of linen equipment X including a fabric type identifying apparatus B according to a second embodiment of the present invention.

As shown in FIG. 5, the fabric type identifying apparatus B of the present embodiment is configured to further include a position detector 55 for detecting the position of the identifier I, in the fabric type identifying apparatus A according to the first embodiment. The configurations other than this are the same as those of the first embodiment. Thus, the same reference numerals are imparted to the same members, and the description thereof is omitted.

Any configuration of the position detector 55 is available without being limited particularly in the case where the identifier I is attached to the edge portion of the fabric F, as long as the position detector 55 is capable of detecting the position in the width direction of the edge portion of the fabric F. For example, the configuration shown in FIG. 6 is used.

Figure 6:
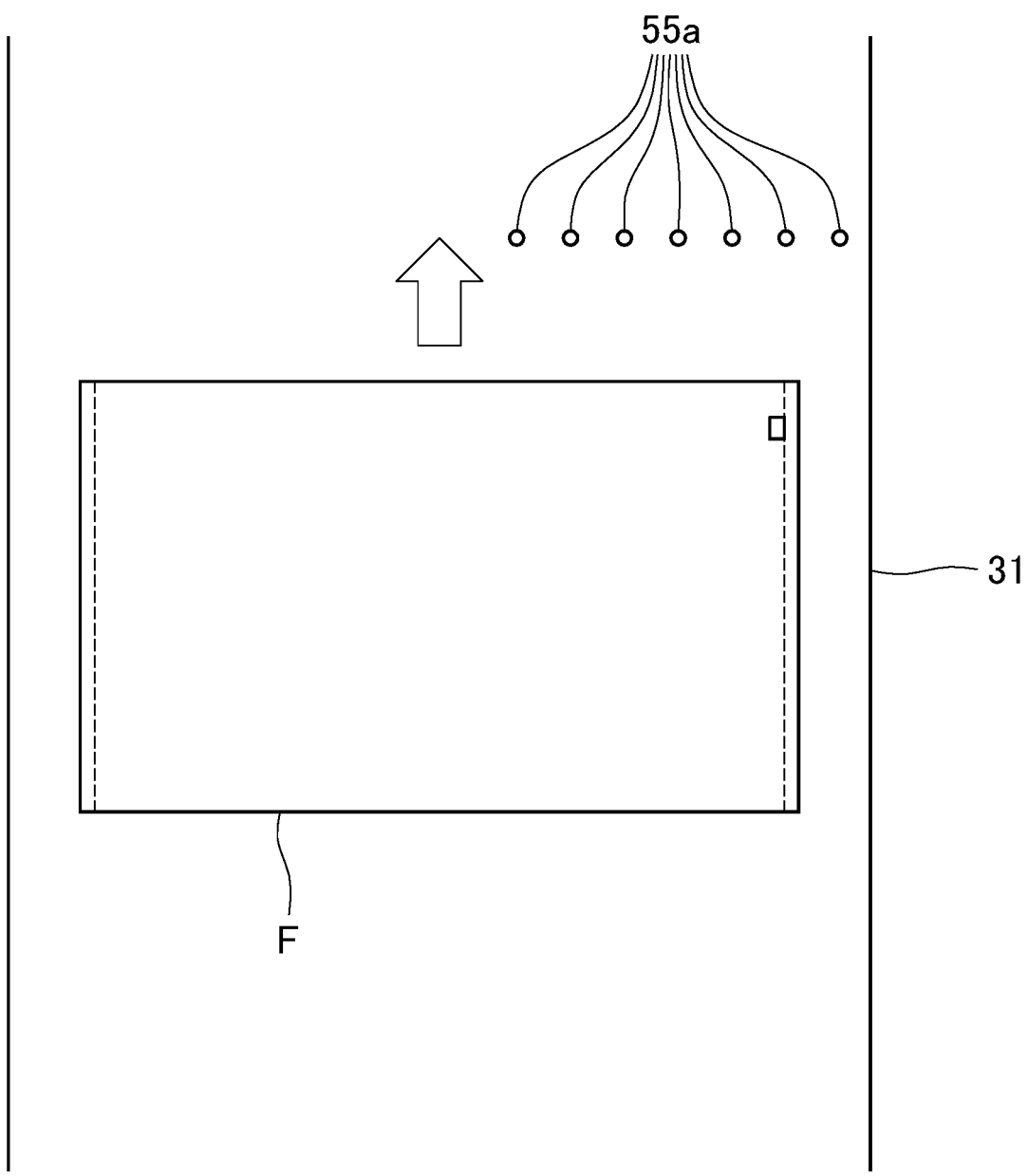
FIG. 6 is a diagram illustrating one example of a position detector 55.

The position detector 55 shown in FIG. 6 is configured with a plurality of photoelectric sensors 55a aligned along the width direction of the introduction conveyor 31. The fabric F passes over the plurality of photoelectric sensors 55a. One edge portion of the fabric F is determined to be positioned between the photoelectric sensor(s) 55a having detected the fabric F and the photoelectric sensor(s) 55a having detected none of the fabric F among the plurality of photoelectric sensors 55a.

The position information of the edge portion of the fabric F, that is, the identifier I, is input into the traverse controller 54 by the position detector 55 instead of by the charging-machine controller 11. The traverse controller 54 crosswise moves the camera 51 on the basis of the position information input by the position detector 55.

As described above, the position detector 55 is included, thereby allowing the fabric type identifying apparatus B independently to adjust the position of the camera 51 without depending on the charging machine 10 or the like.

It is noted that the position where the identifier I is attached is not limited to the edge portion of the fabric F. In this case, the position detector 55 is configured to detect the position in the width direction of the identifier I.

Other Embodiments

In the above-described embodiment, the traversing device 53 is configured to be automatically controlled by the traverse controller 54. Alternatively, the traversing device 53 may be configured to be operated manually. That is, a worker may manually adjust the position of the camera 51. In the case where there is no need of frequent position adjustment of the camera 51 because the type of the fabric F is changed less frequently, such a configuration does not cause an excessive burden to a worker.

Various types of apparatuses requiring information of the type of the fabric F are usable without being limited particularly to the stacking part 40, as an apparatus using the identification result by the fabric type identifying apparatus A.

REFERENCE SIGNS LIST

X LINEN EQUIPMENT
10 CHARGING MACHINE
11 CHARGING-MACHINE CONTROLLER
20 ROLL IRONER
30 FOLDING MACHINE
40 STACKING PART
45 STACKING-PART CONTROLLER
A, B FABRIC TYPE IDENTIFYING APPARATUS
51 CAMERA
52 IMAGE PROCESSING DEVICE
53 TRAVERSING DEVICE
54 TRAVERSE CONTROLLER
55 POSITION DETECTOR

The invention claimed is:

1. A fabric type identifying apparatus for identifying a type of a fabric provided with an identifier in a predetermined position of the fabric, the fabric type identifying apparatus comprising:
a camera for photographing the fabric with the identifier, which is conveyed on a conveyor;
a traversing device for moving the camera crosswise in a direction orthogonal to a conveying direction of the fabric and positioning the camera so that the identifier passes through a photographing area of the camera, when the identifier deviates from the photographing area of the camera; and
an image processing apparatus for receiving an image input and photographed by the camera, wherein
the image processing apparatus identifies the type of the fabric on a basis of the identifier included in the input image of the fabric.

2. The fabric type identifying apparatus according to claim 1, further comprising a traverse controller for controlling the traversing device, wherein the traverse controller operates the traversing device to position the camera so that the identifier passes through the photographing area of the camera, when position information of the identifier is input.

3. The fabric type identifying apparatus according to claim 2, wherein
   the traverse controller receives the position information of the identifier from a charging machine, the fabric being put in the charging machine.

4. The fabric type identifying apparatus according to claim 2, the fabric type identifying apparatus comprising:
   a position detector for detecting a position of the identifier, wherein
   the traverse controller receives the position information of the identifier from the position detector.

5. The fabric type identifying apparatus according to claim 1, wherein the traversing device includes a ball screw mechanism configured with a screw shaft and a nut part to which the camera is fixed.

6. The fabric type identifying apparatus according to claim 1, wherein the traversing device includes an endless chain wound around a pair of sprockets and a slider which is fixed to the endless chain and slides on a rail of the traversing device, and the camera is fixed to the slider.

* * * * *